US012685260B2

(12) United States Patent
    Van Den Berg

(10) Patent No.: US 12,685,260 B2
(45) Date of Patent: Jul. 21, 2026

(54) METHOD AND SYSTEM FOR HARVESTING AND PROCESSING FEED CROP

(71) Applicant: Lely Patent N.V., Maassluis (NL)

(72) Inventor: Karel Van Den Berg, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 525 days.

(21) Appl. No.: 18/038,874

(22) PCT Filed: Dec. 13, 2021

(86) PCT No.: PCT/IB2021/061628
     § 371 (c)(1),
     (2) Date: May 25, 2023

(87) PCT Pub. No.: WO2022/130167
     PCT Pub. Date: Jun. 23, 2022

(65) Prior Publication Data
     US 2024/0016086 A1      Jan. 18, 2024

(30) Foreign Application Priority Data

Dec. 14, 2020    (NL) ..................................... 2027101

(51) Int. Cl.
     A01D 41/127       (2006.01)
     A01B 69/04        (2006.01)
     A01K 5/00         (2006.01)
(52) U.S. Cl.
     CPC .......... A01D 41/127 (2013.01); A01B 69/008 (2013.01)
(58) Field of Classification Search
     CPC .. A01B 69/004; A01B 69/008; A01D 41/127; A01D 41/1277; A01D 41/1278;
     (Continued)

(56) References Cited

U.S. PATENT DOCUMENTS

| 5,557,859 A | 9/1996 | Baron |
| 2013/0177670 A1 | 7/2013 | Steckel et al. |

(Continued)

FOREIGN PATENT DOCUMENTS

| CN | 107259136 A | 10/2017 |
| CN | 205284168 U | 6/2018 |

(Continued)

OTHER PUBLICATIONS

International Search Report, issued in PCT/IB2021/061628, dated Mar. 1, 2022.

(Continued)

*Primary Examiner* — Joseph M Rocca
*Assistant Examiner* — Robert E Pezzuto
(74) *Attorney, Agent, or Firm* — Birch, Stewart, Kolasch & Birch, LLP

(57)            ABSTRACT

A method includes automatically harvesting a first amount of feed crop in a part of a crop field by an autonomous, unmanned device; automatically loading the first amount of harvested feed crop directly into a storage space provided on the autonomous, unmanned device; automatically transporting the first amount of harvested feed crop from the crop field to a crop processing location by the autonomous, unmanned device; automatically unloading the first amount of harvested feed crop from the storage space of the autonomous, unmanned device at the crop processing location; and processing the first amount of harvested feed crop at the crop processing location by the crop processor. The control device is configured for controlling the autonomous, unmanned device to repeat the steps to harvest a second amount of feed crop, and for monitoring of the processing of the first amount of harvested feed crop by the crop processor.

20 Claims, 3 Drawing Sheets

(58) Field of Classification Search
CPC .... A01D 93/00; A01D 43/085; A01D 43/063; A01D 43/073; A01D 43/087; A01D 90/12; A01D 90/16; A01F 25/183; A01F 25/045; A01F 15/071; A01K 5/02; A01K 5/01; A01K 1/10; A01K 5/0283; A01K 5/0266; A01K 5/0275; A01K 5/001; B60P 3/066; F26B 3/286; F26B 19/005; F26B 21/083
See application file for complete search history.

(56)                     References Cited

U.S. PATENT DOCUMENTS

| | | | |
|---|---|---|---|
| 2017/0086429 A1 | 3/2017 | Horton et al. | |
| 2017/0202177 A1 | 7/2017 | Loosveld | |
| 2020/0187525 A1 | 6/2020 | Sanders et al. | |
| 2022/0151156 A1* | 5/2022 | Bidram | A01G 25/167 |
| 2023/0180659 A1* | 6/2023 | Grieshop | A01D 41/1217 56/16.6 |

FOREIGN PATENT DOCUMENTS

| | | |
|---|---|---|
| EP | 2 591 659 A1 | 5/2013 |
| WO | WO 2020/263079 A1 | 12/2020 |

OTHER PUBLICATIONS

Written Opinion of the International Searching Authority, issued in PCT/IB2021/061628, dated Mar. 1, 2022.

* cited by examiner

METHOD AND SYSTEM FOR HARVESTING AND PROCESSING FEED CROP

BACKGROUND OF THE INVENTION

1. Field of the Invention

The present invention relates to an agricultural method for harvesting and processing a feed crop using an unmanned autonomous device. The invention also relates to a system to perform the method.

2. Description of Background Art

Such a method is known. Prior art document U.S. Pat. No. 5,557,859 discloses a method of continuously cutting, solar drying, baling and accumulating crop directly in the field in a single pass operation within a contained, transportable chamber. Solar drying is not very efficient. All the crop-processing operations are performed in the field, which is complex and costly. Other known methods all have drawbacks too. Many of them require manual labor or at least the use of a machine operator and/or a tractor driver. Others are restricted to harvesting and processing crop locally in the crop field. Still others involve temporarily depositing the harvested crop on the soil, which leads to pollution of the crop. There is a need for an improved, highly automated and universal method for both harvesting and processing feed crop.

SUMMARY OF THE INVENTION

It is an object of the present invention to provide an improved agricultural method and system for harvesting and processing feed crop.

The invention achieves the object at least in part by means of a method according to claim 1, in particular an agricultural method, using at least one autonomous, unmanned device, a control device and crop processing means, comprising:

a) automatically harvesting a first amount of feed crop in a part of a crop field by means of the autonomous, unmanned device;

b) automatically loading the first amount of harvested feed crop directly into a storage space provided on the autonomous, unmanned device;

c) automatically transporting the first amount of harvested feed crop from the crop field to a crop processing location provided with the crop processing means by means of the autonomous, unmanned device;

d) automatically unloading the first amount of harvested feed crop from the storage space of the autonomous, unmanned device at the crop processing location; and e) processing the first amount of harvested feed crop at the crop processing location by means of the crop process- ing means;

wherein the control device is configured for controlling the autonomous, unmanned device to repeat steps a) to d) to harvest a second amount of harvested feed crop, and for monitoring of the processing of the first amount of harvested feed crop by the crop process- ing means.

In this way, an efficient, completely automated method is realized wherein harvested feed crop is delivered at a crop processing location, where the crop is further processed, and the control device automates the supply of further amounts of harvested feed crop to the crop processing location. A farmer or farmworker previously needed for this task can now spend his or her time on other tasks around a farm or animal barn.

Harvested feed crop is traditionally used as fresh fodder for animals in husbandry. However, feed crop can also be processed to obtain improved fodder for animals, both ruminants and non-ruminants, or fodder that can be stored for longer periods of time, such as hay or silage. Addition- ally, or alternatively, the harvested feed crop can be used as raw material in refinement processes to produce refined products, such as food suitable for humans, for instance dairy without the involvement of dairy animals, such that the dairy products derived thereof are suitable for a vegan diet (animal-free dairy), or plant-based proteins and carbohy- drates.

The step of automatically loading may be done without the first amount of harvested feed crop contacting the soil. It is noted that the above agricultural method may avoid any contact of the harvested crop with the soil, which has great advantages over the known methods in which mowing, tedding, raking, and loading the crop results in considerable pollution of and damage to said crop, both the harvested crop and the crop remaining on the field.

The crop processing location may be a stationary crop processing location. i.e. the location where the crop is being processed is fixed, at least for a longer period of time, such as a week, a month, a year or longer. Alternatively, the crop processing location may be a mobile crop processing loca- tion, i.e. the location where the crop is being located changes per time period, such as every hour, or every day. Such a mobile crop processing location may be used in combination with mobile crop processing means. Alternatively, the crop processing means may be mobile, but the location may be fixed, such that the crop processing means may be used at different predetermined locations, that in turn may be sta- tionary.

Irrespective of the process that the feed crop undergoes at the crop processing location, the advantage of the invention is that a continuous stream of harvested feed crop can be supplied to the crop processing means, such that the crop processing can be a continuous process, even if the feed crop is harvested in batches.

Alternatively, the crop processing means can process the harvested feed crop in batches for which the supply of feed crop is ready upon starting processing a new batch. The time interval between subsequent batches can thus be reduced to a minimum, or adapted to make the process optimally efficient. The monitoring may be a reiterative process, for instance when the rate of processing varies over time, the time interval between harvested batches can be adjusted thus.

The unmanned, autonomous device may be an unmanned autonomous vehicle, such as a harvesting robot, and may be provided with automatic driving means and navigation means to navigate a plot of land where the feed crop grows. The provision of the control device allows for an automatic monitoring of the processing and adapt the timing of the repetition of the method steps to the processing at the crop processing location. The control device may be provided on the unmanned, autonomous device, or at the crop processing location, for instance provided with the crop processing means. The feed crop may be any kind of grass, alfalfa, cereal grasses or any other suitable crop.

According to an embodiment, monitoring of the process- ing comprises determining a rate of processing the first amount of harvested feed crop by the crop processing means. The monitoring may be performed in different ways, and preferably using sensors or imaging units, such as a camera or a laser sensor. Other devices can be used as well, such as a weighing scale or volumetric device, in combination with a time recording device. The monitoring can thus be automated. The information obtained from the monitoring may be shared with the control device.

In a further embodiment, the controlling device is further configured for determining the rate of processing, such that the control device is able to determine when the autonomous, unmanned device has to start executing steps a) to d) to harvest the second amount of harvested feed crop. The controlling device may be equipped to determine the rate of processing by the crop processing means from the monitoring data. The control device can determine from the monitoring data when the next harvest cycle of feed crop needs to be started, such that a subsequent amount of harvested feed crop is delivered in time to the crop processing means. Alternatively, the method steps in claim 1 may be repeated indifferently of the rate of processing, but be time-dependent and controlled by the control device based on pre-programmed time-intervals. Furthermore, the start of a next harvesting cycle according to method steps a) to d) may depend on information on the crop field and/or weather obtained from other sensors and/or external sources, i.e. websites and/or databases. Examples of such information may be the amount of available crop on the crop field, size of the crop field, crop height, nutrient contents of the crop, growth rate of the crop, time of year (peak of grow season), etc.

Advantageously, determining the rate of processing by the control device comprises determining a third amount of remaining harvested feed crop at the crop processing location after predefined time intervals, wherein the third amount of remaining harvested feed crop represents unprocessed first amount of harvested feed crop. In yet another embodiment, determining the rate of processing by the control device comprises determining a fourth amount of product being produced during a predetermined interval by the crop processing means. The rate of processing can thus be measured in several ways, such as a rate of intake of harvested feed crop, a rate in which the feed crop is transformed into a product during the process, or as an output rate of the refined product.

Preferably, after the harvesting step the additional step of automatically fertilizing said part of the crop field using the autonomous, unmanned device is performed. This ensures a good soil regeneration. Performing this step right after the harvesting step has the advantage that the soil is readily accessible. Besides, the soil and/or the crop is not compressed or pressed down, ensuring an excellent fertilization of the soil.

Refining the feed crop can be done in various ways. It is advantageous to have the freshly harvested feed crop directly transported to the crop processing station to start processing the crop quickly. This prevents deteriorating of nutrients in the feed crop over time. In an embodiment, processing the first amount of harvested feed crop comprises obtaining proteins and/or carbohydrates from the first amount of harvested feed crop, wherein the proteins and/or carbohydrates form a basis for food and/or feed products. The obtained proteins from the first amount of harvested feed crop may be animal-free milk proteins, wherein the animal-free milk proteins form a basis for animal-free dairy products. Preferably, the animal-free milk proteins are obtained by fermentation of the harvested crop feed, using for example a fungi or yeast culture. Milk proteins derived directly from the feed crop, and not via milking a dairy animal, i.e. animal-free dairy, has the advantage of a high purity of milk proteins, like whey and casein proteins, and the absence of lactose and other less desired substances, such as antibiotics and/or hormones.

Alternatively, processing the first amount of harvested feed crop comprises extracting proteins and/or carbohydrates from the first amount of harvested feed. The plant-based proteins and/or carbohydrates obtained from the feed crop after extraction can be stored for an extended amount of time, to be used to feed a multiple of animals than by the original amount of harvested feed crop at a later stage.

The invention also relates to a system for performing the method, in particular, a system for performing the method above, comprising:

an autonomous, unmanned device provided with automatic driving means comprising wheels, navigation means, automatic feed harvesting means for harvesting the first amount of feed crop, automatic feed loading means, a feed storage space, and automatic feed unloading means;

a land surface on which the feed crop grows;

a control device;

an automatic energy charging device for the autonomous, unmanned device; and a crop processing location with crop processing means for processing the first amount of harvested feed crop.

wherein the control device is configured to control the autonomous, unmanned device to harvest a second amount of feed crop from the land surface according to the method described above, and to monitor the processing of the first amount of harvested feed crop by the crop processing means. An efficient, multi-purpose, highly flexible and completely automatic system is thus realized.

The system of the invention is particularly suitable to perform the agricultural method as described above, as the system is able to perform this method automatically using the autonomous, unmanned device, in particular a vehicle, to harvest feed crop grown on the land surface (i.e. crop field) and transport the harvested feed crop. The land surface may be a plot of land used as a meadow or arable land to grow grass or another suitable feed crop.

The automatic energy charging device may be a charging station where the autonomous, unmanned device can electrically charge its battery or batteries with known charging means and connector means. Alternatively, or additionally, the automatic energy charging device may comprise solar cells and a transformer to charge the batteries while the autonomous, unmanned device is outside.

In an embodiment, the processing is monitored through a rate of processing the first amount of harvested feed crop by the crop processing means. The rate of processing of the first amount of harvested feed crop, or any other amount, may be a useful tool to monitor the processing. Any increase or decrease (continuous or sudden) in the rate of processing may indicate a change, good or bad, in the processing. Preferably, or in addition of the embodiment above, the controlling device is further configured to determine the rate of processing by the crop processing means, such that the control device is able to determine when the autonomous, unmanned device has to start harvesting the second amount of harvested feed crop.

The control device may be equipped with a detector, such as an imaging unit or other suitable sensor, for example a laser sensor, to determine the rate of processing.

The rate of processing may be determined by determining a third amount of remaining harvested feed crop at the crop processing location after predefined time intervals, wherein the third amount of remaining harvested feed crop represents unprocessed first amount of harvested feed crop. Alternatively, or additionally, the rate of processing may be determined by determining a fourth amount of product produced by the crop processing means during a predetermined interval.

The moment that the harvesting steps of the above method are repeated to supply the crop processing means can be determined in various ways. The remaining amount of feed crop to be processed measured at certain time intervals, or continuous over time, may tell something about the rate of intake of the crop processing means. The produced amount of product from the feed crop measured at certain time intervals, or continuous over time, may tell something about the rate of output of the crop processing means. These measurements can be done simultaneously, such that intake and output can be simultaneously monitored and compared, for instance for synchronization and fine-tuning of the processing.

In yet a further embodiment, an additional step of refining the harvested feed at the crop processing location is performed at the crop processing location. Instead of preserving the harvested feed crop at the crop processing location by drying (hay) or ensilaging (silage), there is an alternative way of processing it: refining the crop. This may be done in various ways, for instance by means of extraction, or by fermentation.

In an embodiment of the system according to the invention, the crop processing means is configured to obtain proteins and/or carbohydrates from the first amount of harvested feed crop, wherein the proteins and/or carbohydrates form a basis for food and feed products. The crop processing means may comprise an extraction station for extracting proteins and/or carbohydrates from the harvested feed crop. In a manner known as such, a juice can be extracted from the crop, which can be separated into different fractions in order to extract, for example, proteins and carbohydrates. This constitutes a highly useful alternative way of processing the freshly harvested feed crop. It is advantageous to have the freshly harvested feed crop directly transported to the crop processing station to start processing the crop quickly. This prevents deteriorating of nutrients in the feed crop over time. The proteins and/or carbohydrates obtained from the feed crop can be stored for an extended amount of time, to be used to feed a multiple of animals than by the original amount of harvested feed crop at a later stage.

Alternatively, the crop processing means may comprise a fermentation station for obtaining milk proteins through fermentation of the harvested feed crop, wherein the milk proteins form a basis for animal-free dairy products. Milk proteins derived directly from the feed crop, and not via milking a dairy animal, i.e. animal-free dairy, has the advantage of a high purity of milk proteins, like whey and casein proteins, and the absence of lactose and other less desired substances, such as antibiotics and/or hormones. For such fermentation, a fungi or yeast culture may be used.

The refining steps may be proceeded by the necessary preparatory steps needed to make the feed crop suitable for the extraction or fermentation process.

BRIEF DESCRIPTION OF THE DRAWINGS

The invention will now be further explained with reference to the following figures.

DETAILED DESCRIPTION OF THE INVENTION

Figure 1:
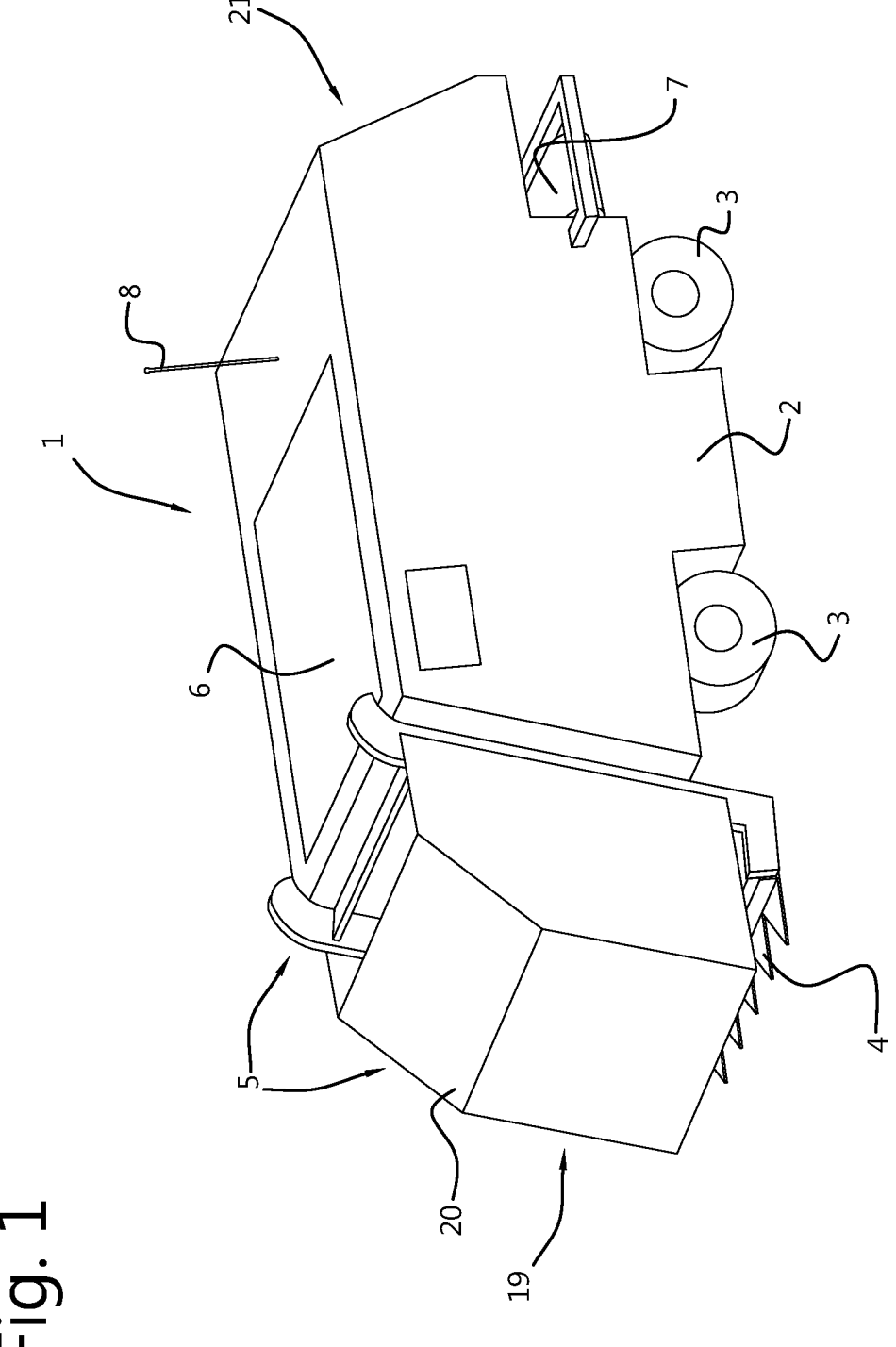
FIG. 1 shows an autonomous, unmanned device for use in the invention.

In FIG. 1 an embodiment of an autonomous, unmanned device 1 according to the invention is depicted. The autonomous, unmanned device 1 is a self-propelled vehicle with a body 2 and wheels 3, constituting a crop-harvesting robot. The front side 19 is provided with automatic harvesting means 4, here shown in the form of an automatic mowing device. Furthermore, there are automatic loading means 5 with a cover 20, for conveying the harvested crop into a storage space 6 inside the body 2. These automatic loading means 5 can comprise a known conveyor belt with cleats, arranged in the protective cover 20. At the rear side 21 unloading means 7 for automatically unloading and dosing crop at a destination location are provided, here shown as a side discharge. An antenna 8 on top of the body 2 is provided for communication purposes, for instance with a control device (not shown).

Not shown are drive means, such as an engine (fuel, gas or electric), for the autonomous, unmanned device 1 and the control device, for instance a computer or other control means, with the aid of which the autonomous, unmanned device 1 is controlled and operated. The control device may comprise a processor, navigation means and an interface. It can be included in the autonomous, unmanned device 1, but it can also be located elsewhere and communicate with the vehicle 1 via antenna 8.

Also not shown is an automatic energy charging device, such as a charging station, for the autonomous, unmanned device 1, where it can electrically charge its battery or batteries with known charging means and connector means. Alternatively, it is also possible to use a combustion engine or any other suitable means for driving the device 1, instead of a rechargeable battery.

Figure 2:
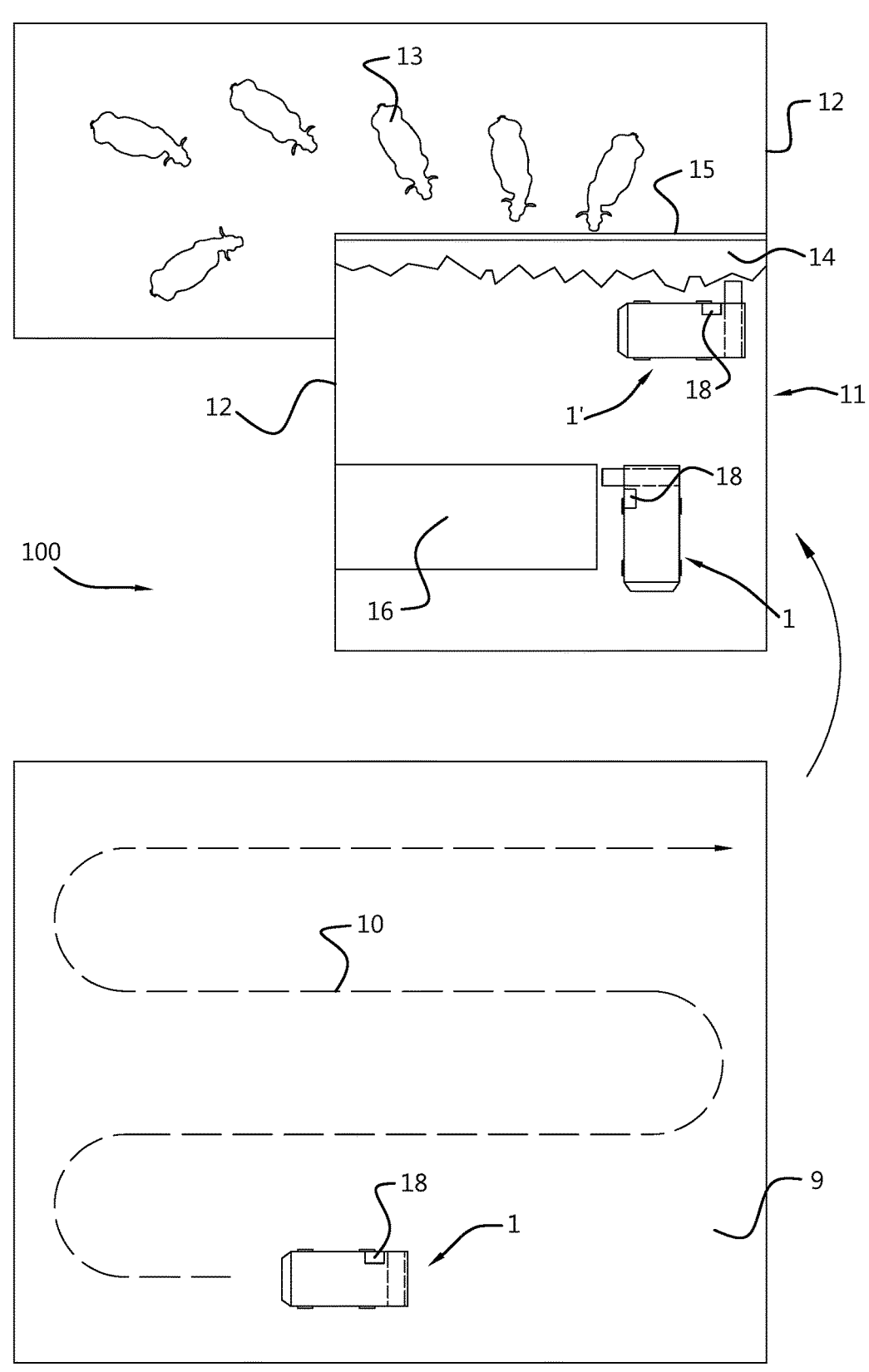
FIG. 2 shows a system according to the invention.

FIG. 2 shows a system 100 according to the invention. The autonomous, unmanned device 1 moves over a crop field 9, for example a grass field, following a path 10, under the control of the control device. When the autonomous, unmanned device 1 has finished mowing and loading the grass, it moves to a crop processing location 16, which will be described further below. The crop processing location 16 is shown as a stationary crop processing location in a barn 12, where cows 13 are located as well, as shown in FIG. 2.

In accordance with the invention, feed crop is automatically harvested in a part of the crop field 9 by means of the autonomous, unmanned device 1. Then, the harvested feed crop is automatically loaded directly into storage space 6 provided on the autonomous, unmanned device 1 without said harvested feed crop contacting the soil. The harvested feed crop is then automatically transported from the crop field 9 to the stationary crop processing location 16 by means of the autonomous, unmanned device 1, where it is automatically unloaded from the storage space 6 of the autonomous, unmanned device 1.

In addition, the autonomous, unmanned device 1 is provided with a sensor 18, such as a height sensor, for example a laser sensor, to measure or determine the amount of crop at the destination location 11. The sensor 18 can communicate with the control device, so that the control device can consider the measurements when determining the crop demand at the destination location 11. The crop demand is based on a rate of processing at the stationary crop processing location 16. The rate of processing can be determined by measurements by the sensor 18 at regular intervals, while the autonomous, unmanned device 1 remains at the stationary crop processing location 16. Upon determination of the rate of processing, the control device may calculate the amount of time needed for the autonomous, unmanned device 1 to drive to the starting point for the subsequent in the crop field. The time lapsed during harvesting and driving back to the destination location 11 from the end of the harvesting run determines when the autonomous, unmanned device 1 can start repeating the method steps to replenish the amount of harvested feed crop at the stationary crop processing location 16.

After visiting the stationary crop processing location 16, the autonomous, unmanned device 1 may return to the crop field 9 for a next harvesting run, when the control device has established from a measurement of sensor 18 that the amount of crop at the destination location 11 has to be replenished. Freshly harvested crop 14 to the destination location 11 is thus supplied, such that the crop processing means 16 can process harvested feed crop continuously.

The amount of feed crop 14 collected in the storage space 6, and/or the amount of harvested feed crop at the stationary processing location are monitored as well. Monitoring means for monitoring the amount of feed crop 14 collected in the storage space 6 can be weighing means such as a weighing floor in the storage space 6 or at the stationary processing location 16, or feed height sensors provided at, in or near the storage space 6, at the stationary processing location 16, and/or in the crop processing means.

The surface of the crop field 9 already harvested can be monitored by means of the control device with the help of the navigation means and after visiting the destination location 11 the autonomous, unmanned device 1 is automatically returned to the crop field 9 to a starting location in dependence on the surface of the crop field 9 already harvested, as registered in the control device with the help of the navigation means. The autonomous device 1 is then ready for a next harvesting run. This is being performed repeatedly, and controlled by the control device, so that a sufficient supply of harvested feed crop at the destination location 11 to perform the processing is guaranteed. The monitoring of the crop field surface can be done in a simple way, e.g. by registering the starting point and end of the harvesting trajectory, but preferably use is made of the navigation means (known as such). The end of the last harvesting run can be taken as the starting point for the next run.

It is noted that in FIG. 2 the path 10 for the autonomous, unmanned device 1 is only a schematic illustration. Normally, the device 1 will have to move up and down the field 9 quite a number of times. As soon as the controlling device has decided that the device 1 should go to the destination location 11, having taken into account the expected feed crop demand (as determined with e.g. the height sensor 18), the collected amount of feed crop in the storage space 6 (as determined e.g. with the weighing floor) and the expected travel path and time from the current position of the device 1 to the destination location 11 (as determined with the navigation means), the device 1 leaves the field 9 along the optimal path 10 calculated by the control device and moves towards the destination location 11. The device 1 might leave the field 9 at any location if that provides a shorter route to the destination location 11. FIG. 2 is a mere schematic representation of the system.

The feed crop harvested by the autonomous, unmanned device 1 can also be used as feed and distributed to a group of animals 13, in conjunction to delivering the harvested feed crop to the stationary processing location 16 for processing by the crop processing means 22. The autonomous, unmanned device 14 then unloads the harvested feed crop 14 from the storage location 6 at a feed fence 15 via the side discharge 7.

After the harvesting step, the additional step of automatically fertilizing said part of the crop field 9 using the autonomous, unmanned device 1 can be performed. This ensures a good soil regeneration. Performing this step right after the harvesting step has the advantage that the soil is readily accessible. Besides, the soil and/or the crop is not compressed or pressed down, ensuring an excellent fertilization of the soil.

To this end, a fertilizer mix tank for containing a fertilizer mix (e.g. fertilizer diluted with water) may additionally be provided on the device 1, with a volume of e.g. 100 liters. On device 1, between the harvesting means 4 and the wheels 3 there may be provided fertilizer mix dosing means (connected to the fertilizer mix tank), e.g. comprising a row of dosing nozzles on a dosing bar (known as such, not shown). The dosing nozzles are provided, seen in the direction of travel of the autonomous, unmanned device 1, behind the harvesting means 4 and before the wheels 3. This is a technically simple, yet beneficial solution. The soil and/or the crop is not compressed or pressed down by the wheels 3, ensuring a better fertilization of the soil. A fertilizer mix filling station (not shown) for (re) filling the fertilizer mix tank can be arranged e.g. at the energy charging station for the device 1, preferably at or near the destination location 11.

Figure 3:
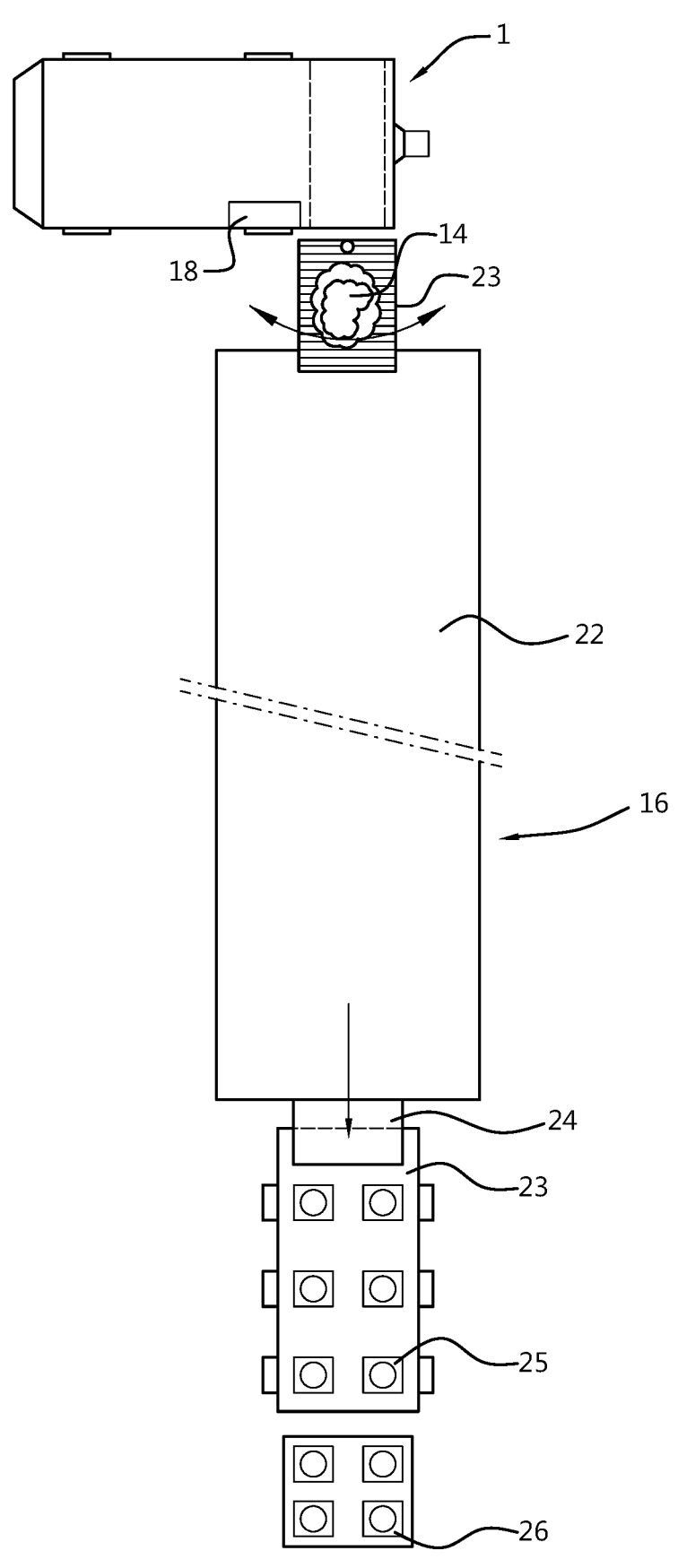
FIG. 3 shows the unmanned device at a crop processing location with crop processing means according to the invention.

The stationary crop processing location 16 according to the invention will be described in further detail with reference to FIG. 3. FIG. 3 shows the unmanned device 1 at a stationary crop processing location 16 with crop processing means 22 according to the invention.

In FIG. 3 the autonomous, unmanned device 1 has arrived at the destination location 11, which is the stationary crop processing location 16. The harvested crop is then automatically unloaded from the storage space 6 by means of the automatic unloading and dosing means 7. i.e. the side discharge, at the rear end of device 1 (see FIG. 1). The side discharge 7 is suitable for unloading the crop at both sides of the device 1. The crop is unloaded onto a transporting means 23, for instance a conveyer belt, where the crop is being guided to the crop processing means 22.

At the crop processing location 16, the additional step of refining the harvested feed is performed. Refinement can be done by either fermentation, or by extraction. In the latter case, a juice can be pressed out of the crop, which can be separated into different fractions in order to extract, for example, protein (known as such). This constitutes a highly useful alternative way of processing the freshly harvested feed crop. In the former case, the crop processing means 22 may include a tank for fermenting the feed crop. Fermentation of the feed crop may result in animal-free milk proteins, such as whey and casein proteins.

After the refinement process, the resulting products are packed at a packaging station 24. Packaging may be done in a suitable way, dependent on the kind of products made with the refinement. FIG. 3 schematically shows jars or bottles 25 emerging from the crop processing means 22 on a second transporting means 23. However, this can be bags or other containers as well. The jars 25 are grouped on trays 26 for further transportation and distribution.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

LIST OF ITEMS

1. Autonomous, unmanned device
2. Body
3. Wheels
4. Automatic harvesting means
5. Automatic loading means
6. Storage space
7. Automatic unloading means
8. Antenna
9. Crop field
10. Path
11. Destination location
12. Barn
13. Cow
14. Feed crop
15. Feed fence
16. Crop processing location
17. Sensor
18. Front side of device
19. Cover
20. Rear side
21. Crop processing means
22. Transporting means
23. Packaging station
24. Jar
25. Tray

The invention claimed is:

1. An agricultural method, using at least one autonomous, unmanned device, a control device and a crop processor, comprising the steps of:
   a) automatically harvesting a first amount of feed crop in a part of a crop field by means of the at least one autonomous, unmanned device;
   b) automatically loading the first amount of harvested feed crop directly into a storage space provided on the at least one autonomous, unmanned device;
   c) automatically transporting the first amount of harvested feed crop from the crop field to a crop processing location provided with the crop processor by means of the at least one autonomous, unmanned device;
   d) automatically unloading the first amount of harvested feed crop from the storage space of the at least one autonomous, unmanned device at the crop processing location; and
   e) processing the first amount of harvested feed crop at the crop processing location by means of the crop processor;
   wherein the control device is configured for controlling the at least one autonomous, unmanned device to repeat steps a) to d) to harvest a second amount of harvested feed crop, and for monitoring of the processing of the first amount of harvested feed crop by the crop processor.

2. The method according to claim 1, wherein monitoring of the processing comprises determining a rate of processing the first amount of harvested feed crop by the crop processor.

3. The method according to claim 1, wherein the control device is further configured for determining a rate of processing according to step e), such that the control device is able to determine when the at least one autonomous, unmanned device has to start executing steps a) to d) to harvest the second amount of harvested feed crop.

4. The method according to claim 3, wherein determining the rate of processing by the control device comprises determining a third amount of remaining harvested feed crop at the crop processing location after predefined time intervals, wherein the third amount of remaining harvested feed crop represents an unprocessed first amount of harvested feed crop.

5. The method according to claim 3, wherein determining the rate of processing by the control device comprises determining a fourth amount of product being produced during a predetermined interval by the crop processor.

6. The method according to claim 1, wherein processing the first amount of harvested feed crop comprises obtaining proteins and/or carbohydrates from the first amount of harvested feed crop, wherein the proteins and/or carbohydrates form a basis for food and feed products.

7. The method according to claim 6, wherein the obtained proteins from the first amount of harvested feed crop are animal-free milk proteins, wherein the animal-free milk proteins form a basis for animal-free dairy products.

8. The method according to claim 7, wherein the animal-free milk proteins are obtained by fermentation of the harvested crop feed.

9. The method according to claim 6, wherein processing the first amount of harvested feed crop comprises extracting the proteins and/or carbohydrates from the first amount of harvested feed.

10. The method according to claim 1, wherein after the automatically harvesting step, the method further comprising the additional step of automatically fertilizing said part of the crop field using the autonomous, unmanned device.

11. The method according to claim 1, wherein the step of automatically loading is performed without the first amount of harvested feed crop contacting soil.

12. A system for performing the method according to claim 1, comprising:
   the at least one autonomous, unmanned device provided with an automatic drive comprising wheels, a navigation device, an automatic feed harvester for harvesting the first amount of feed crop, an automatic feed loader, a feed storage space, and an automatic feed unloader;
   a land surface on which the feed crop grows;
   the control device;
   an automatic energy charging device for the at least one autonomous, unmanned device; and
   the crop processing location with the crop processor for processing the first amount of harvested feed crop,
   wherein the control device is configured to control the at least one autonomous, unmanned device to harvest a second amount of feed crop from the land surface and to monitor the processing of the first amount of harvested feed crop by the crop processor.

13. The system according to claim 12, wherein the processing is monitored by a determination of a rate of processing the first amount of harvested feed crop by the crop processor.

14. The system according to claim 12, wherein the control device is further configured to determine a rate of processing by the crop processor, such that the control device is able to determine when the at least one autonomous, unmanned device has to start harvesting the second amount of harvested feed crop.

15. The system according to claim 13, wherein the rate of processing is determined by determining a third amount of remaining harvested feed crop at the crop processing location after predefined time intervals, wherein the third amount of remaining harvested feed crop represents an unprocessed first amount of harvested feed crop.

16. The system according to claim 14, wherein the rate of processing is determined by determining a fourth amount of product produced by the crop processor during a predetermined interval.

17. The system according to claim 12, wherein the crop processor is configured to obtain proteins and/or carbohydrates from the first amount of harvested feed crop, wherein the proteins and/or carbohydrates form a basis for food and feed products.

18. The system according to claim 17, wherein the crop processor comprises an extraction station for extracting proteins and/or carbohydrates from the harvested feed crop.

19. The system according to claim 17, wherein the crop processor comprises a fermentation station for obtaining animal-free milk proteins through fermentation of the harvested feed crop, wherein the milk proteins form a basis for animal-free dairy products.

20. The method according to claim 2, wherein the control device is further configured for determining the rate of processing according to step e), such that the control device is able to determine when the at least one autonomous, unmanned device has to start executing steps a) to d) to harvest the second amount of harvested feed crop.

\* \* \* \* \*